US012251902B2

(12) United States Patent
Baumgartner et al.

(10) Patent No.: US 12,251,902 B2
(45) Date of Patent: Mar. 18, 2025

(54) RADIAL PRESS

(71) Applicant: Uniflex-Hydraulik GmbH, Karben (DE)

(72) Inventors: Carsten Baumgartner, Laubach (DE); Vaclav Hejplik, Dietzenbach (DE); Reiner Viehl, Frankfurt (DE)

(73) Assignee: Uniflex-Hydraulik GmbH, Karben (DE)

( * ) Notice: Subject to any disclaimer, the term of this patent is extended or adjusted under 35 U.S.C. 154(b) by 252 days.

(21) Appl. No.: 18/077,885

(22) Filed: Dec. 8, 2022

(65) Prior Publication Data

US 2023/0114893 A1 Apr. 13, 2023

Related U.S. Application Data

(63) Continuation of application No. PCT/EP2021/070350, filed on Jul. 21, 2021.

(30) Foreign Application Priority Data

Aug. 11, 2020 (DE) ........................ 102020121142.2

(51) Int. Cl.
*B30B 7/04* (2006.01)
*B30B 1/00* (2006.01)
(Continued)

(52) U.S. Cl.
CPC ................ *B30B 7/04* (2013.01); *B30B 1/007* (2013.01); *B30B 15/041* (2013.01); *B30B 15/062* (2013.01); *B30B 15/068* (2013.01)

(58) Field of Classification Search
CPC .. B30B 1/007; B30B 1/40; B30B 7/04; B30B 15/04; B30B 15/041; B30B 15/062;
(Continued)

(56) References Cited

U.S. PATENT DOCUMENTS 4,306,442 A * 12/1981 Schrock ................ B21D 41/04
72/402
4,550,587 A 11/1985 Eisenzimmer
(Continued)

FOREIGN PATENT DOCUMENTS

DE 3512241 A1 10/1986
DE 3611253 C2 3/1989
(Continued)

OTHER PUBLICATIONS

International Search Report issued for International Patent Application No. PCT/EP2021/070350, mailed on Oct. 21, 2021.

*Primary Examiner* — Jimmy T Nguyen
(74) *Attorney, Agent, or Firm* — Myers Wolin, LLC

(57) ABSTRACT

A radial press is provided having a first and a second ring structure extending about a press axis. Multiple press bodies are arranged about the press axis between the ring structures and are movably supported on support surfaces paired with the ring structures. The axial distance between the two ring structures can be changed using a drive system having a plurality of actuators oriented parallel to the press axis and distributed about the press axis. The support surfaces paired with one of the two ring structures are inclined relative to the press axis, and the press bodies are guided in a forced manner relative to the two ring structures in that the press bodies are equipped with guide grooves into which guide bodies engage.

18 Claims, 5 Drawing Sheets

(51) Int. Cl.
*B30B 15/04* (2006.01)
*B30B 15/06* (2006.01)

(58) Field of Classification Search
CPC ... B30B 15/068; B30B 15/0052; B21D 39/04; B21D 39/046; B21D 39/048; B21J 13/025; B25B 27/10
See application file for complete search history.

(56) References Cited

U.S. PATENT DOCUMENTS

| | | | | |
|---|---|---|---|---|
| 4,766,808 | A | 8/1988 | Schroeck | |
| 5,634,367 | A | 6/1997 | Yamada et al. | |
| 2017/0087620 | A1 * | 3/2017 | Goff | A61F 2/95 |
| 2018/0361459 | A1 * | 12/2018 | Hejplik | B30B 7/04 |

FOREIGN PATENT DOCUMENTS

| | | | | |
|---|---|---|---|---|
| DE | 000020017791 | U1 | 12/2000 | |
| DE | 102005041487 | A1 | 4/2007 | |
| DE | 102006036654 | A1 | 2/2008 | |
| DE | 102016106650 | A | 10/2017 | |
| DE | 102017119403 | A1 | 2/2019 | |
| EP | 1302255 | A | 4/2003 | |
| EP | 1302255 | A1 * | 4/2003 | B21D 39/048 |
| FR | 2341093 | A1 | 9/1977 | |

* cited by examiner

RADIAL PRESS

CROSS REFERENCE TO RELATED APPLICATIONS

This application is a continuation under 35 U.S.C. § 120 of International Application PCT/EP2021/070350, filed Jul. 21, 2021, which claims priority to German Application No. 102020121142.2, filed Aug. 11, 2020, the contents of each of which are incorporated by reference herein.

FIELD OF THE INVENTION

The present invention relates to a radial press with a first and a second ring structure extending around a press axis and, disposed between them around the press axis, several pressing elements displaceably braced at bracing faces associated with the ring structures, wherein the axial distance of the two ring structures from one another can be varied by means of a drive system, which comprises a multiplicity of actuators oriented parallel to the press axis and disposed in distributed manner around it, of which respectively a first component is coupled with a first of the two ring structures and a second component, actively movable relative to the first component, is coupled with the second ring structure, and wherein furthermore at least the bracing faces associated with one of the two ring structures are oriented at an inclination to the press axis and the pressing elements are guided compulsorily relative to the two ring structures.

BACKGROUND

Radial presses with a first and a second ring structure extending around a press axis and, disposed between them around the press axis and associated with the ring structures, several bracing faces of displaceably bracing pressing elements, wherein the axial distance of the two ring structures from one other can be varied by means of a drive system, which comprises a multiplicity of actuators oriented parallel to the press axis and disposed in distributed manner around it, of which respectively a first component is coupled with a first of the two ring structures and a second component, actively movable relative to the first component, is coupled with the second ring structure, and wherein furthermore at least the bracing faces associated with one of the two ring structures are oriented at an inclination to the press axis, are known in various configurations (see, for example, DE 35 12 241 A1, U.S. Pat. No. 4,550,587 A, FR 2 341 093 A1, DE 36 11 253 C2 and DE 10 2016 106 650 A1) and are being used (for example in the form of the "HM 200" radial press of Uniflex Hydraulik GmbH, Karben). During approach-induced by corresponding operation of the drive system—of the two ring structures toward one another, the pressing elements are forced inward in the direction of the press axis as a consequence of the orientation of the bracing faces (also referred to as "control faces") at an inclination to the press axis. The die is closed. A workpiece disposed between the pressing elements becomes accordingly radially deformed, wherein the degree of inclination of the bracing faces defines the ratio of reduction of the axial movement of the ring structures toward one another relative to the radial movement of the pressing elements. If the two ring structures move apart from one another during inverse operation of the drive system for pressing, the pressing elements-under the action of restoring springs disposed between respectively two pressing elements adjacent to one another—the pressing elements move back outwardly away from the press axis. The die opens and, when the die has completely opened, the formed workpiece may be removed from it. U.S. Pat. No. 4,766,809 A also discloses a radial press of the type explained in the foregoing.

In the radial press that can be inferred from EP 1 302 255 A1, an annular cylinder-piston arrangement surrounding the press axis forms the core of the drive system; by means of this annular cylinder-piston arrangement, the movement of the two ring structures takes place in the sense of their approach during power pressing. Two additionally provided linear actuators acting between the two ring structures provide for rapid positioning during closing as well as opening of the press, i.e. during resetting of the two ring structures by their movement away from one another. In this connection, it is mentioned that—in the sense of the generic construction of the radial press—the radial resetting of the pressing elements during opening of the radial press may also be achieved by means of compulsory coupling of the pressing elements with the two ring structures instead of by means of restoring springs acting between the pressing elements.

The radial presses discussed in the foregoing are both compact and powerful and are characterized by several construction-related advantages-especially compared with those of yoke-press design (see, for example, the "HM 325" radial press of Uniflex Hydraulik GmbH, Karben). They include in particular the fact that the press axis is not displaced during the pressing process, which is essential in particular for automatic charging. A further advantage is the flexibility with respect to the number of pressing elements; if necessary, these may even be provided in an odd number.

Prior art radial presses of the design discussed in the foregoing have absolutely proved their worth for the fabrication of conventional workpieces by deforming them radially. In practice, however, the constructive concepts in question are limited only to such radial presses that are used for the forming of particularly large workpieces (e.g. diameters greater than 500 mm) or that are designed for radial deformation with particularly high pressing force (e.g. greater than 5,000 kN).

SUMMARY

The present invention has set an object of providing a radial press of the generic type, which is suitable for radial deformation of particularly large workpieces under practical conditions, namely accomplished with particularly high pressing force, and is superior in such an application to the prior art, wherein—in the context of high flexibility of use of the radial press due to its suitability for a broad range of applications—ideally workpieces with dimensions much smaller than the maximum size (especially the maximum possible diameter) can also be formed reliably with a radial press suitable accordingly for pressing large workpieces.

According to the invention, this stated object may be achieved in that the compulsory guidance takes place respectively via the pressing elements and pairs, associated with the ring structure in question, of guide slots made in the pressing elements and guide elements, comprising guide rollers, engaging in these. Compared with the prior art, wherein it is widely provided that the pressing elements are radially retracted outward by restoring springs during opening of the radial press, this takes place according to the invention by compulsory guidance of the pressing elements on the two ring structures. The double bilateral compulsory guidance of the pressing elements takes place respectively via the pressing elements and pairs, associated with the ring structure in question, of guide slots and guide elements engaging in these, wherein the guide slots are made in the pressing elements and the guide elements comprise guide rollers.

In other words, the position of the pressing elements is clearly defined by their specific compulsory guidance, more closely defined in the claims, on the two ring structures. Restoring springs acting between the pressing elements can be omitted by implementation of the embodiments disclosed herein.

The compulsory guidance of the pressing elements that take place on the two ring structures is also manifested in several significant advantages relevant to practice. Thus, such double, bilateral compulsory guidance of the pressing elements ensures, for example, that they will not be able to tilt-namely as a consequence of an axially acting load. The resistance of the pressing elements to tilting that can be achieved in this way makes the radial presses of such construction suitable for radial pressing of axially loaded workpieces. This is in turn a decisive aspect, namely in connection with machining of particularly large and/or heavy workpieces, for which radial deformation in radial presses with vertically oriented press axis, i.e. in “upright” radial presses, is advantageous, wherein typically the die must support at least part of the weight of the workpiece while it is being pressed, which is manifested by corresponding axially acting loads. Even in radial presses with recumbent, i.e. more or less horizontally oriented press axis, however, serious advantages can be achieved by implementation of the embodiments, namely especially in its application for joining of component parts clamped together in axial direction, wherein at least part of the corresponding axial clamping forces is transmitted via the pressing elements into the workpiece.

By the fact that-regardless of the specific orientation of the press axis (vertical, horizontal or inclined)—the bilateral compulsory guidance of the pressing elements on the two ring structures reliably counteracts tilting of the pressing elements due to axial forces transmitted from the workpiece to the pressing elements, even workpieces with dimensions considerably smaller than the maximum size can be reliably formed with a radial press suitable for pressing large workpieces by appropriate adaptation of the pressing elements (e.g. by exchanging exchangeable pressing jaws; see below). This is so even with respect to a relatively long lever arm, due to the large radial extent of the pressing elements in question, with which the axial forces transmitted into the pressing elements act in a radial press set up for forming of workpieces with dimensions considerably smaller than the maximum size. Thus a correspondingly large tilting moment acting on the pressing elements does not have a detrimental effect. In turn, the reproducibility of pressing benefits from this, as do consequently the quality of forming and that of the finished workpiece.

Particularly pronounced effects in the foregoing respect are achieved when the extent of the pressing elements in axial direction is particularly large, for example when the extent of the pressing elements (or possibly of the base jaws guided on the ring structures, see below) parallel to the press axis is at least twice as large as transversely relative thereto.

In addition, the bilateral compulsory guidance of the pressing elements-during opening of the radial press-reliably also prevents lifting of the pressing elements toward the press axis from occurring from the bracing faces inclined relative to the press axis due to radially inwardly directed forces. Thus this disclosure also provides a solution for the hazard—that, depending on the specific contour of the workpiece surface in the forming region and the material being used, exists in particular during forming of large workpieces—of just such forces caused by jamming of the pressing elements on the workpiece surface (“pull-out forces”), by which conventional radial presses equipped with restoring springs can be considerably damaged in the extreme case.

Furthermore, in the context of the high flexibility of use (see above) of the radial press, it turns out to be positive that limitation of the working range (i.e. of the maximum possible radial stroke of the pressing elements), such as occurs regularly in conventional radial presses due to the restoring springs (i.e. due to their working range), does not exist for it. The resetting of the pressing elements during opening of the radial press by the bilateral compulsory guidance of the pressing elements on both ring structures permits a larger working range of the radial press compared with the prior art.

In addition, the omission of the restoring springs conventionally disposed respectively between the mutually adjacent pressing elements simplifies the assembly of the radial press. And also the magnitude of the pressing force available on the workpiece benefits from the fact that closing of the die does not have to take place against the restoring force of restoring springs. Precisely in such conventionally constructed radial presses, in which tilting moments and/or pull-out forces co-acting within the spectrum of application on the pressing elements have to be taken into account (see above), the restoring springs must provide very high restoring forces. These cause a reduction, which may be substantial, of the forming force that can be effectively applied on the workpiece.

According to a first preferred configuration of the invention, the drive system is hydraulically constructed, in that the actuators-oriented parallel to the press axis and disposed in distributed manner around it—are constructed as hydraulic cylinder-piston units, of which respectively the cylinder forms the first component coupled in force-transmitting relationship with the first ring structure and the piston rod forms the second component, coupled in force transmitting-relationship with the second ring structure, of the actuator in question. In this case, the advantages, explained in the foregoing, that can be achieved with the invention are particularly pronounced. Nevertheless, such a configuration of the drive system is not imperative. To the contrary, this may also comprise, for example, electrical linear actuators or the like. Although the invention will be explained in the following on the basis of radial presses provided with a hydraulic drive system, this is not to be construed as any restriction of the invention to such a construction of the drive system.

According to another preferred further development of the invention, the pressing elements comprise base jaws and pressing jaws that can be fastened exchangeably to these. In particular, a hydraulically actuatable interlocking system can then act between the base jaws and the pressing jaws. This is beneficial in large presses, where minimal retrofitting times can be achieved by automatic change of the pressing jaws.

The present invention can also be used with particular advantage for such radial presses in which only the bracing faces associated with one of the two ring structures are inclined relative to the press axis, whereas the bracing faces associated with the other ring structure are oriented perpendicular to the press axis. In this way an axial movement of the pressing elements relative to the second-mentioned ring structure is suppressed during closing and opening of the die.

If the latter is constructed as a stationary ring structure (e.g. as a lower ring structure, braced on the foundation, of an upright radial press), the pressing elements also execute no kind of axial movement but exclusively a radial movement during opening and closing of the die. This is a serious advantage, especially in radial presses with mechanical workpiece charging, such as are used in particular for radial pressing of very large component parts that cannot be handled manually. In addition, the pure radial movement of the pressing elements relative to one of the two ring structures is very advantageous, because this facilitates the implementation of a displacement-measuring device acting with radially oriented measuring direction between the ring structure in question and at least one of the pressing elements; and this in turn is of great advantage for precise process control and thus for the quality of the finished workpiece.

In the interests of high fabrication efficiency, embodiments of the inventive radial press are preferably equipped with a rapid positioning drive, by means of which—by rapid approach of the two ring structures—the pressing elements are moved rapidly toward the workpiece to be pressed at the beginning of the respective press cycle, before the (slow) power-pressing then begins. In this regard, an electromechanical rapid positioning drive comprising several positioners is particularly preferred. By implementation of such an electromechanical rapid positioning drive, which comprises several positioners that act functionally in parallel with one another and are coordinated with one another, and by means of which the axial spacing present between the two ring structures is possible without use of hydraulic components, especially without active pressurization of the hydraulic cylinder-piston units, a series of serious advantages is achieved surprisingly simply, especially for the application situation of interest here. Thus, in contrast to the case of radial presses in which the bracing and mating faces have geometry of stepped construction (see FIG. 1 of DE 35 12 241 A1), a largest possible area of contact is available for power-pressing. Accordingly, the high pressing forces desired here between the bracing faces and the associated mating faces can be achieved with acceptable pressures per unit area, which is important from viewpoints of useful life of the radial press, among other reasons. In addition, again in contrast to the case of radial presses in which the bracing and mating faces have geometry of stepped construction (see above), the transition from closing the die in rapid mode to power-pressing adapted to the respective workpiece can be freely adjusted. This permits optimized process workflows, which are favorable for efficiency.

Precisely from viewpoints of efficiency, radial presses with a rapid positioning drive of such construction are also superior to those in which the drive system comprises, in addition to the hydraulic cylinder-piston units that bring about (power-) pressing, at least one further hydraulic cylinder-piston unit-bringing about the rapid positioning. This is so because an electromechanical rapid positioning drive, which comprises several positioners that act functionally in parallel with one another and are coordinated with one another, is characterized by particularly high possible reaction capability; it is able to react much faster to process-internal conditions than a hydraulic rapid drive. Thus the corresponding construction of the radial press makes it possible in particular to suddenly stop the movement of the two ring structures toward one another in rapid mode if, for example, one of the pressing elements comes into contact with the workpiece. Compared with known generic radial presses having a hydraulic rapid drive, closing of the die in rapid mode can take place with a higher speed (higher dynamic response) and closer to the workpiece, without jeopardizing the integrity of the respective workpiece, thus permitting an efficiency-improving shortening of the cycle times.

According to yet another preferred further development of the invention, the cylinder-piston units of the hydraulic drive system are constructed as synchronizing cylinders. This may contribute to substantially further improved advantageous properties of the radial press, namely to a further increased dynamic response. This is so because, due to their construction as synchronizing cylinders, the cylinder-piston units of the drive unit are volume-neutral in rapid mode; no volume difference has to be injected from the tank. Consequently, "refilling" of hydraulic fluid within the respective cylinder-piston unit from one working chamber to the other is able to take place in the rapid mode alone. Make-up suction of hydraulic fluid from the tank can be omitted. In turn, even at high volume flows such as are unavoidable in heavy-duty radial presses because of the large active areas of the cylinder-piston units, therefore, no danger exists that the hydraulic fluid will foam up. Thus a particularly high positioning dynamic response is possible in rapid mode, and problems caused by foaming (e.g. concerning fabrication accuracy) do not occur.

It is particularly advantageous in the foregoing context when a valve unit permitting a direct hydraulic short circuit of the two working chambers of the synchronizing cylinder in question is then associated with each synchronizing cylinder. Thus the refilling of hydraulic fluid within the respective cylinder-piston unit from one working chamber into the other takes place on the shortest possible path. Thus losses can be minimized, because it is possible to work with relatively large flow cross sections. It is quite particularly favorable when the valve units are disposed respectively at the end of the associated piston rod provided with supply ducts. Thus no pipework is needed.

Yet another further-reaching preferred further development is characterized in that the rapid positioning drive comprises a common servo motor acting on all positioners. Here, coordination as it were of the positioners takes place mechanically, by the fact that distribution gear mechanisms are provided in the drive train from the common servo motor to the multiplicity of positioners connected thereto. The compulsory coupling of the positioners provided in this way not only is advantageous to the achievable fabrication precision; for its part, it also favors a particularly high permissible dynamic response in rapid mode. Incidentally, it is particularly preferable if the positioners are not connected directly with the two ring structures but instead act respectively between the cylinder and the piston rod of a hydraulic cylinder-piston unit. Thus the number of force-transmitting links from drive components to the ring structures can be minimized. The optimal integrity of the ring structures favors their shape stability even under the highest loads and thus the avoidance of unnecessarily large masses.

As already mentioned further above, the present invention also proves to be quite particularly beneficial in such "upright" radial presses, in which the press axis is vertically oriented, so that one of the ring structures forms a lower ring structure and the other ring structure forms an upper ring structure. Preferably, the lower ring structure is braced via a load-bearing structure on the foundation but is spaced apart from it. Thus a space into which a correspondingly large workpiece to be pressed can extend is formed underneath the lower ring structure. It is further particularly favorable in such upright inventive radial presses when the upper ring structure is braced on the lower ring structure at least in the scope of a substantial part of its mass as well as of the mass of the elements, associated with it, of the hydraulic cylinder-piston units via spring elements (e.g. gas struts). Ideally, the unit comprising the upper ring structure and the elements of the hydraulic-cylinder-piston units associated therewith is then more or less balanced via the spring elements, so that, due to the hydraulic drive system and/or a possible rapid positioning drive (see above), the forces to be provided for opening the die are small. Just as for the positioners of the rapid positioning drive (see above), it is also the case for the spring elements explained in the foregoing that, particularly preferably, they engage not directly and immediately on the two ring structures but instead indirectly, by the fact that the spring elements act between the lower ring structure and the elements, associated with the upper ring structure, of the hydraulic cylinder-piston units.

To avoid misconceptions, it is to be remarked as a precaution that the term “ring structure” in no way implies that the structure in question is more or less round. To the contrary, the decisive feature is that the structure extends in closed manner around a central open region. For example, the outer contour of the “ring structure” in question may also approximate a polygon. Nevertheless, a contour at least very closely approaching a circular shape is still particularly advantageous, and specifically because of the distribution, approaching ideal conditions, of stresses within the ring structures and also of the methods that can be used for their fabrication.

BRIEF DESCRIPTION OF THE DRAWING

The present invention will be explained in more detail in the following on the basis of a preferred exemplary embodiment, illustrated in the drawing, wherein.

DETAILED DESCRIPTION OF THE PREFERRED EMBODIMENTS

Figure 1:
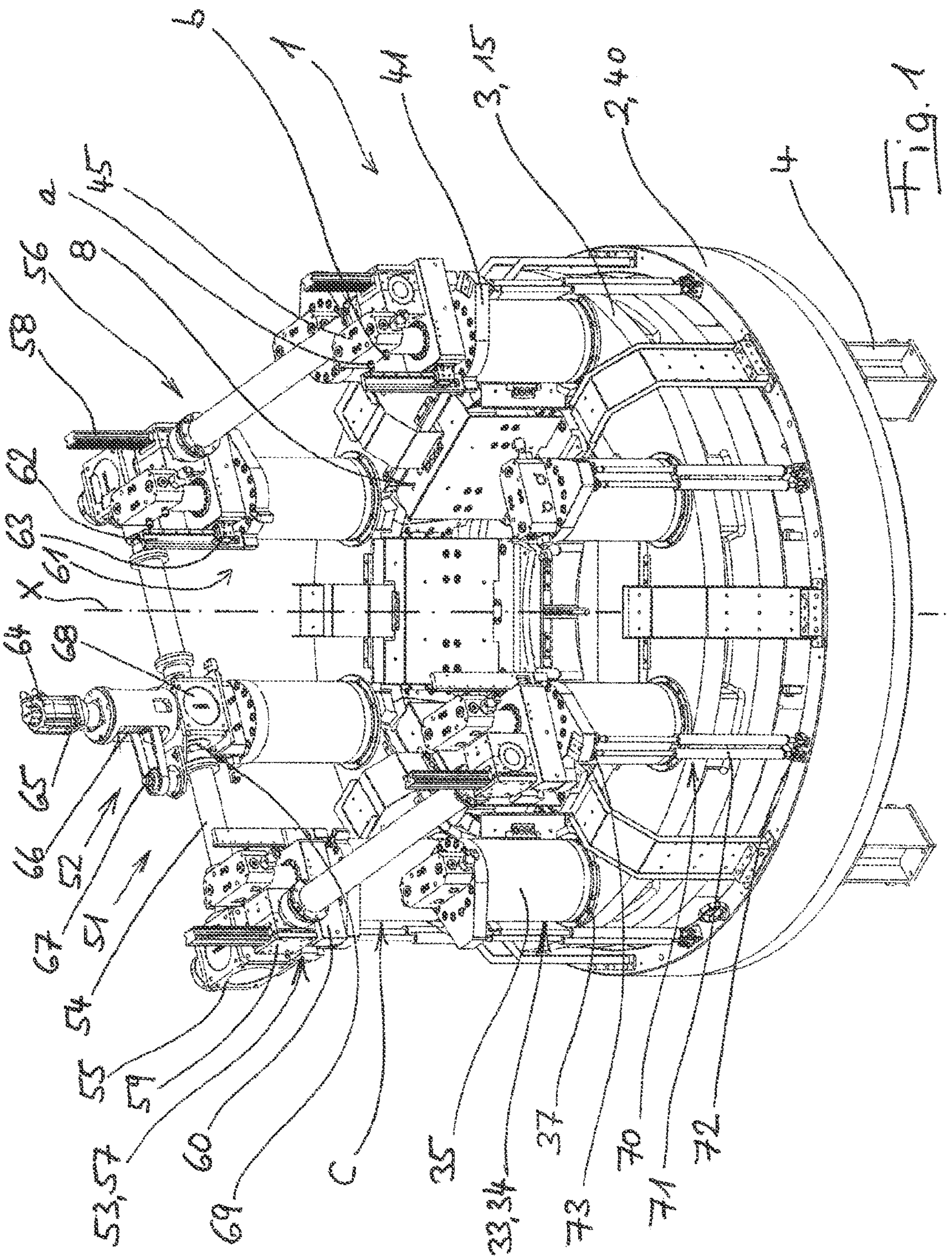
FIG. 1 shows the radial press in question in perspective view obliquely from above.
Figure 2:
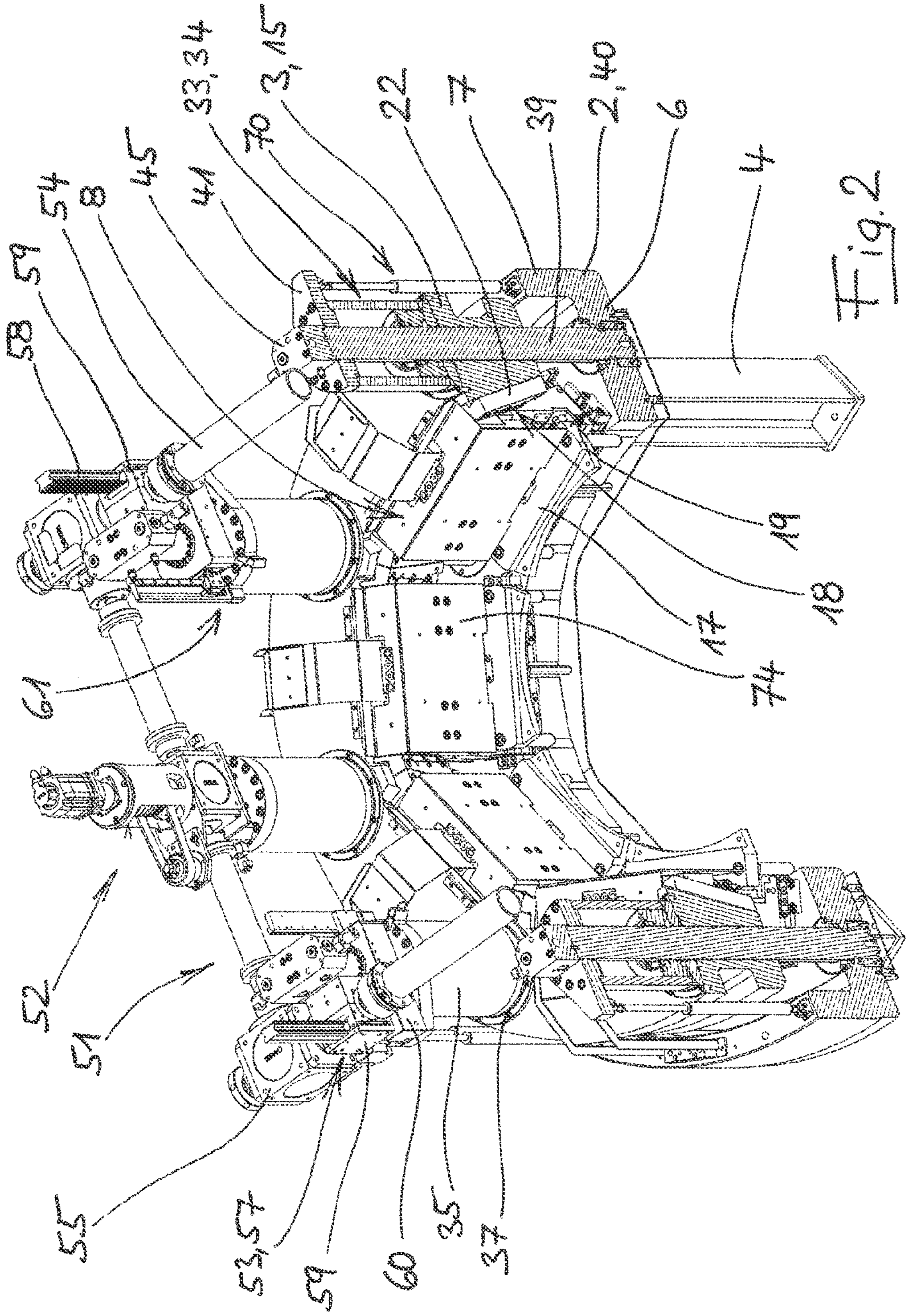
FIG. 2 shows, in an angled view similar to that of FIG. 1, the radial press shown therein in cutaway representation.
Figure 3:
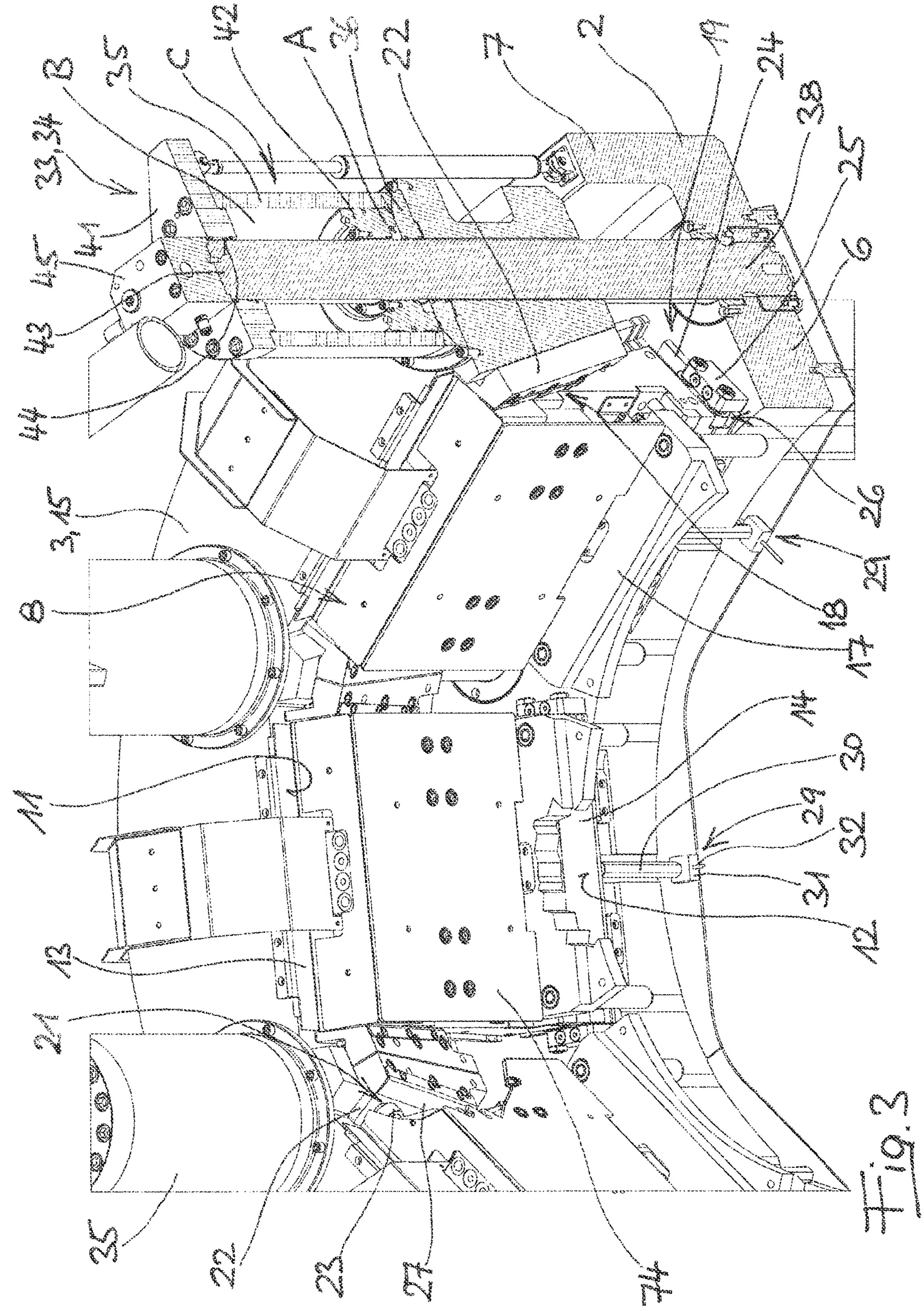
FIG. 3 shows a section from FIG. 2 on an enlarged scale.
Figure 4:
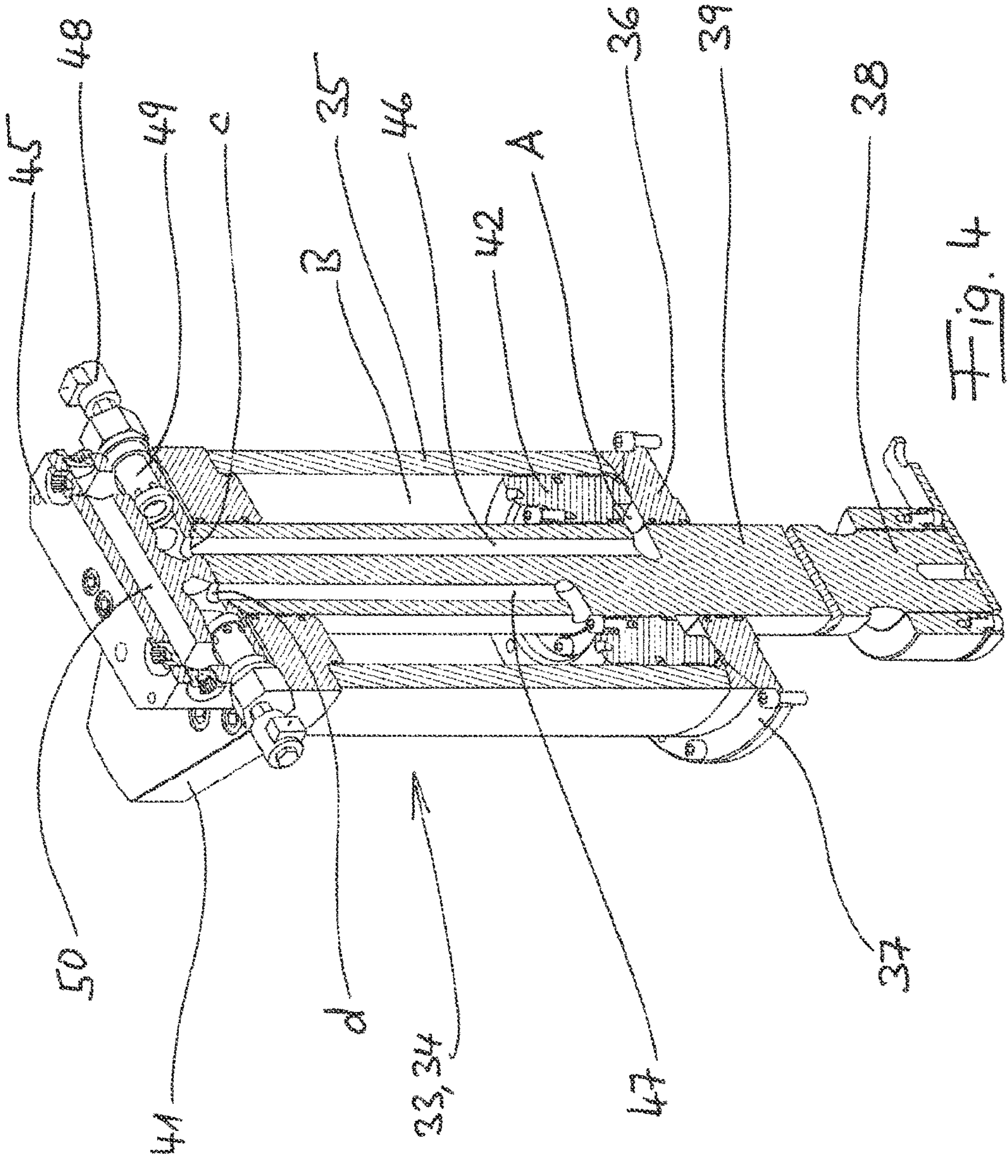
FIG. 4 shows, in perspective view obliquely from above, one of the eight hydraulic cylinder-piston units of the radial press shown in FIGS. 1-3
Figure 5:
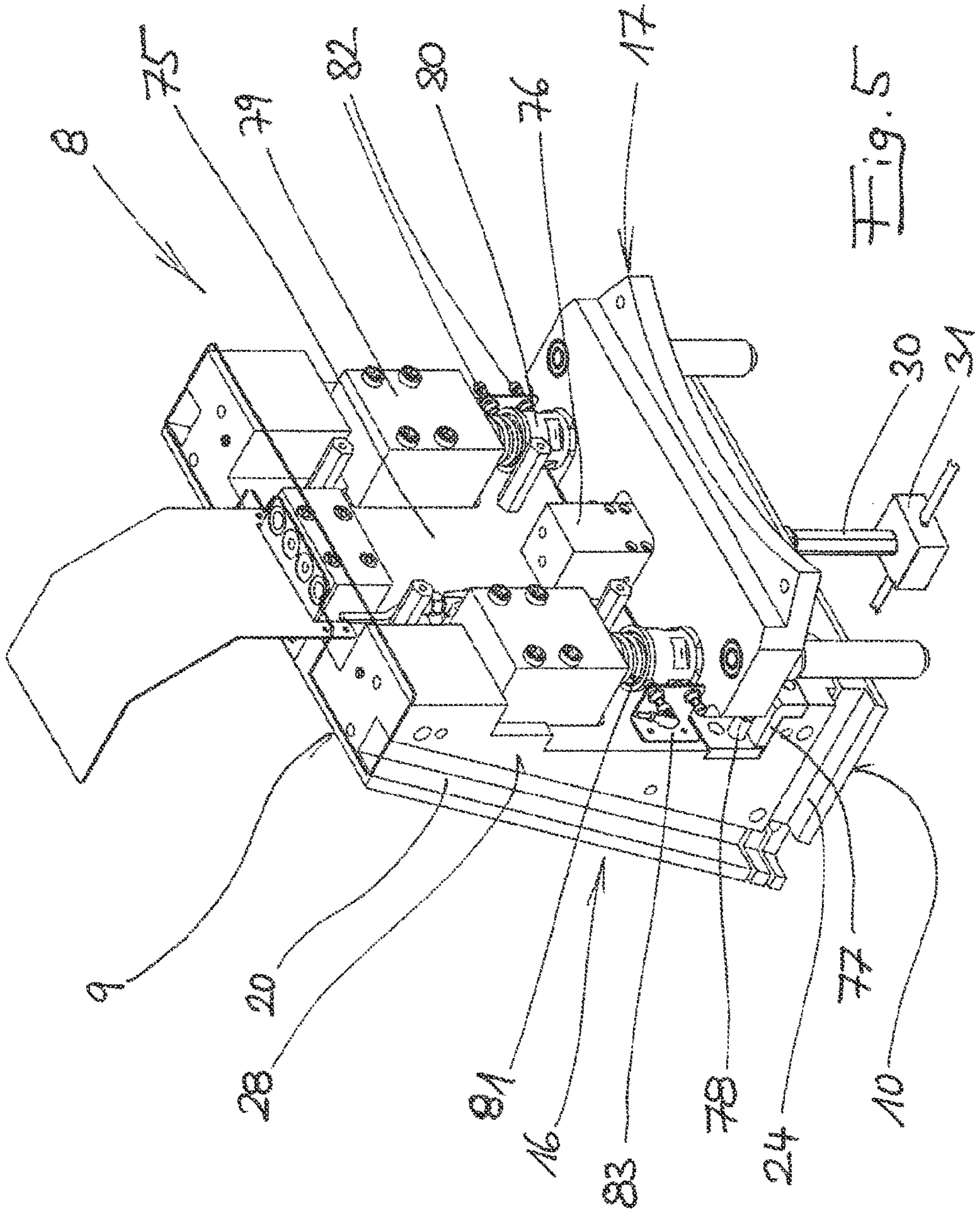
FIG. 5 shows one of the eight pressing elements of the radial press according to FIGS. 1-3 without the associated panel.

Radial press 1, illustrated in the drawing, designed for operation with vertical press axis X, comprises a first, lower ring structure 2 and a second, upper ring structure 3. Both ring structures 2, 3 extend around press axis X. This lower ring structure 2 is constructed as a stationary ring structure and is braced via beams 4 on the foundation. The second, upper ring structure 3 can be raised and lowered by means of a drive system, which comprises eight actuators C disposed around the press axis and oriented parallel thereto, i.e. the spacing of upper ring structure 3 relative to lower ring structure 2 can be decreased and increased by means of the drive system. The lower ring structure has a pot-like basic shape (with an open region at the center!), by the fact that it has a bottom ring 6 and a substantially cylindrical wall 7 towering from it; it is so dimensioned that lowered upper ring structure 3 is inserted into lower ring structure 2 in the sense that it and cylindrical wall 7 of lower ring structure 2 overlap one another.

Furthermore, the radial press comprises, disposed uniformly around press axis X, eight pressing elements 8, which-via associated upper mating faces 9 and lower mating faces 10—are respectively braced in slidingly displaceable manner on an upper plane bracing face 11 associated with upper ring structure 3 as well as on a lower plane bracing face 12 associated with lower ring structure 2. These upper bracing faces 11 are respectively constructed on the surface of an exchangeable upper sliding plate 13, and the lower bracing faces 12 are respectively constructed on the surface of an exchangeable lower sliding plate 14. Whereas lower bracing faces 12 (as well as associated lower mating faces 10) stand perpendicular to press axis X, upper bracing faces 11 (as well as associated upper mating faces 9) are oriented at an inclination to press axis X. Thus upper bracing faces 11 represent “control faces”, via which an axial movement of upper ring structure 3 is transformed into a radial movement of pressing elements 8. Upper ring structure 3 thus forms a “control ring” 15.

Pressing elements 8 comprise base jaws 16, on which upper and lower mating faces 9 and 10 are constructed, and pressing jaws 17 that can be attached exchangeably to base jaws 16. Each of the base jaws 16—the extent of which parallel to press axis X is approximately twice as large as transversely relative thereto—is guided on upper ring structure 3 via an upper compulsory guide 18 and on lower ring structure 2 via a lower compulsory guide 19 in such a way that it is held (at least substantially) without clearance on the two associated bracing faces 11 and 12, i.e. it cannot be raised from them. Upper compulsory guide 18 then comprises two guide slots 20 machined laterally in base jaws 16 in question and extending parallel to upper mating face 9 and, engaging therein and disposed on upper ring structure 3, guide elements 21 in the form of roller arrangements 23 attached to an (upper) roller carrier 22. Correspondingly, lower compulsory guide 19 has its guide slots 24 and roller arrangements 26 attached to (lower) roller carriers 25. The individual rollers are then respectively mounted on a bolt constructed as a positioning cam. For guidance of base jaws 16 in circumferential direction, sliding plates 27, which respectively define a bracing face and on which base jaws 16 are braced via associated mating faces 28, are attached to upper roller carriers 22.

Respectively one displacement-measuring device 29 (with measuring direction parallel to lower compulsory guides 19, i.e. oriented radially), by means of which respectively the relative position of the base jaw 16 in question relative to lower ring structure 2 can be indicated, is associated with at least one part of pressing elements 8. Displacement-measuring device 29 in question comprises a pin 30 connected with the base jaw 16 in question and projecting downward from this with a transducer 31, which is disposed on its end and which cooperates with an associated ruler 32 fixed on lower ring structure 2 and extending radially.

The drive system used for relative movement of the two ring structures 2 and 3 relative to one another is hydraulically constructed; it comprises—as actuators C-eight hydraulic cylinder-piston units 33 oriented parallel to press axis X and a pressure-supply unit (not illustrated but of customary construction) having a tank, a motor-pump unit and a controller. Hydraulic cylinder-piston units 33—respectively disposed with gaps on pressing elements 8—are constructed as synchronizing cylinders 34. Via an associated flange 37 formed on cylinder bottom 36, cylinder 35 is respectively joined securely with upper ring structure 3 (control ring 15). Lower end 38 of the respective piston rod 39 extending through cylinder 35 is accordingly joined securely with lower ring structure 2 ("bracing ring" 40).

Two hydraulic working chambers A and B, bounded off from one another by piston 42, which is securely joined with piston rod 39, are defined in each hydraulic cylinder-piston unit 33, within the respective cylinder 35, which is closed at the top by a cover 41 with through-bore. These are supplied through piston rod 39 with through-bore. A valve unit 45 is built onto upper end 43 of piston rod 39 passing through through-bore 44 of cover 41—or possibly on an assembly plate (see below) joined to it. This respectively has four ports a, b, c, d; via two of these (ports a and b), it communicates with the pressure-supply unit, whereas the two other ports c and d communicate with supply ducts 46 and 47 extending within piston rod 39 and supplying the two working chambers A and B. The two switching valves 49 integrated in the respective valve unit 45 and actuatable via an electrical actuator 48 permit changeover between on the one hand fluidic communication of the two working chambers A and B with the pressure-supply unit (via respectively a passing connection of port a with port c and of port b with port d) and on the other hand a direct hydraulic short circuit of the two working chambers A and B via an internal bypass 50, via which ports c and d communicate fluidically with one another. In the said second switched position, the two working chambers A and B are shut off from the pressure-supply unit by means of switching valve 49.

The said bypasses 50 are opened when rapid positioning of the two ring structures 2 and 3 toward one another is taking place by means of a rapid positioning drive 51. This is electromechanically constructed and comprises a drive unit 52, four positioners 53 and one drive train 56 provided with drive unit 52 with shafts 54 and angle gear mechanisms 55 joining the four positioners 53. A hydraulic cylinder-piston unit 33—acting between cylinder 35 and piston rod 39—is associated with each of the four positioners 53 (constructed as rack-and-pinion units 57). For this purpose, a toothed gear, which is mounted rotatably in a toothed pinion housing 59, is engaged with a toothed rack 58 fixed on the cover 41 of the respectively associated hydraulic cylinder-piston unit 33. This toothed-pinion housing 59 is built onto an assembly plate 60, which in turn is securely joined with the end portion, projecting from cover 41, of piston rod 39 of the hydraulic cylinder-piston unit 33 in question. Four displacement-measuring systems 61, having respectively one ruler 62 fixed on cover 41 of the associated hydraulic cylinder-piston unit 33 and one transducer 63 fixed on the assembly plate 60 in question are provided functionally in parallel with the four positioners 53.

Drive unit 52, which is likewise joined (at least indirectly) in positionally invariable relationship to piston rod 39 of the hydraulic cylinder-piston unit 33, in question and in particular is built onto valve unit 45 associated with this, comprises a servo motor 64 with a flange-connected, self-locking planetary gear mechanism 65, an electromechanical separating clutch 66, an input 67 used for manual actuation and a distributing gear mechanism 68 with two outputs 69, to which associated shafts 54 of drive train 56 are connected.

The unit consisting of upper ring structure 3 and the eight cylinders 35, joined thereto, of hydraulic cylinder-piston units 33, is braced at least in the scope of a substantial part of its mass via spring elements 70 on lower ring structure 2. For this purpose, gas struts 71 extend between respectively a lower link point 72 associated with lower ring structure 2 and an upper link point 73 associated with cover 41 of a hydraulic cylinder-piston unit 33.

As regards the fixation, on base jaws 16, of the pressing jaws 17 that can be attached exchangeably to base jaws 16, hydraulically actuatable interlocks, which permit automated fitting of the eight base jaws 16 with a set of pressing jaws, are provided for the purpose-respectively protected by a panel 74 in ready-to-operate condition of radial press 1. The interlocks comprise respectively one clamping unit 76, which is attached to base body 75 of the base jaw and has a pivotably driven claw, which pulls the respective pressing jaw 17—bearing on reinforcing rail 77 of base body 75 of the base jaw-radially outward to its interlocking position defined by stops 78. Furthermore, the interlock respectively comprises, disposed in pairs on base body 75 of the base jaw, two hydraulic cylinders 79 having, attached to the respective piston rod, interlocking heads 80, which press the pressing jaw 17 in question into the associated seat of base body 75 of the base jaw. A mechanical spring 81 then supports respectively the hydraulic cylinder 79 in question and ensures that the pressing jaw 17 in question is also held without external energy on the respective base jaw 16, i.e. does not tilt due to its own weight. The position of interlocking heads 80 is detected by means of sensors 82, which are attached via angle pieces 83 to base body 75 of the base jaw.

What is claimed is:

1. A radial press with a first and a second ring structure extending around a press axis and, disposed between them around the press axis, several pressing elements displaceably braced at a plurality of bracing faces associated with the ring structures, wherein an axial distance of the two ring structures from one another can be varied by means of a drive system, which comprises a multiplicity of actuators oriented parallel to the press axis and disposed in distributed manner around it, of which respectively a first component is coupled with a first of the two ring structures and a second component, actively movable relative to the first component, is coupled with the second ring structure, and wherein furthermore at least a first set of bracing faces of the plurality of bracing faces associated with one of the two ring structures are oriented at an inclination to the press axis and the pressing elements are guided compulsorily relative to the two ring structures, wherein compulsory guidance takes place respectively via, associated with the pressing elements and the ring structure in question, pairs of guide slots made in the pressing elements and guide elements, comprising guide rollers, engaging in the guide slots.

2. The radial press of claim 1, wherein the pressing elements comprise base jaws and pressing jaws that can be fastened exchangeably to the base jaws.

3. The radial press of claim 2, wherein the extent of the base jaws parallel to the press axis is at least twice as large as transversely relative thereto and/or in that a hydraulically actuatable interlock system acts between the base jaws and the pressing jaws.

4. The radial press of claim 1, wherein only the first set of bracing faces associated with the one of the two ring structures are inclined relative to the press axis, whereas a second set of bracing faces of the plurality of bracing faces associated with the other ring structure are oriented perpendicular to the press axis.

5. The radial press of claim 4, wherein the ring structure having the second set of bracing faces is constructed as a stationary ring structure.

6. The radial press of claim 5, wherein a displacement-measuring device with radially oriented measuring direction acts between the stationary ring structure and at least one of the pressing elements.

7. The radial press of claim 1, wherein the press axis is vertically oriented, wherein one of the ring structures forms a lower ring structure and the other ring structure forms an upper ring structure.

8. The radial press of claim 7, wherein the upper ring structure is braced on the lower ring structure at least in the scope of a substantial part of its own mass as well as of that of the components, associated with it, of the actuators via spring elements.

9. The radial press of claim 1, wherein a hydraulic drive system is provided wherein the actuators are constructed as hydraulic cylinder-piston units, of which respectively a cylinder forms the first component and a piston rod forms the second component of the actuator in question.

10. The radial press of claim 9, wherein the cylinder-piston units are constructed as synchronizing cylinders.

11. The radial press of claim 10, wherein the valve units are disposed respectively at the end of the associated piston rod, provided with supply ducts.

12. The radial press of claim 1, wherein an electromechanical rapid positioning drive comprising several positioners is provided.

13. The radial press of claim 12, wherein the rapid positioning drive comprises a common servo motor acting on all of the several positioners.

14. The radial press of claim 12, wherein the several positioners act respectively between the components, actively positionable relative to one another, of an actuator.

15. The radial press of claim 7, wherein the lower ring structure is braced via a load-bearing structure on a foundation but is spaced apart from the foundation.

16. The radial press of claim 8, wherein the spring elements, constructed as gas springs, act between the lower ring structure and the components, associated with the upper ring structure, of the actuators.

17. The radial press of claim 10, wherein a valve unit permitting a direct hydraulic short circuit of two working chambers of the synchronizing cylinder in question is associated with each synchronizing cylinder.

18. The radial press of claim 14, wherein the several positioners act between a cylinder and a piston rod of a hydraulic cylinder-piston unit.

* * * * *